April 7, 1925.  1,532,534
E. R. HEWITT
LEADER AND METHOD OF MAKING THE SAME
Filed Jan. 28, 1922
Fig. 1.
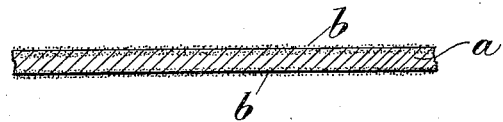
Fig. 2.
INVENTOR
Edward R. Hewitt
BY
Redding & Greeley
ATTORNEYS Patented Apr. 7, 1925.

1,532,534

UNITED STATES PATENT OFFICE.

EDWARD R. HEWITT, OF MIDVALE, NEW JERSEY.

LEADER AND METHOD OF MAKING THE SAME.

Application filed January 28, 1922. Serial No. 532,512.

*To all whom it may concern:*

Be it known that I, EDWARD R. HEWITT, a citizen of the United States, residing in Midvale, in the State of New Jersey, have invented certain new and useful Improvements in Leaders and Methods of Making the Same, of which the following is a specification, reference being had to the accompanying drawing, forming a part hereof.

This invention relates to leaders for fish hooks and, more particularly, to the conventional type of silkworm gut leader which, whether stained or unstained, has been found to act as a lens in use, thereby concentrating the light which passes through it. With the light coming from above to the fish which is below it will be evident that such a light streak, especially when intensified in the manner indicated, has a natural tendency to scare fish away since it produces a flash which is unlike any other flash to which the fish might be accustomed. The lens effect naturally results from the round form and semi-transparent quality of the leader. The principal object of the present invention is to eliminate this condition in leaders and especially leaders of silkworm gut so that no flash-light will be produced by them in use. In accordance with the broad aspects of the invention, it is proposed to cover the leader with a metallic salt and reduce the salt to the metallic state by light or chemical means. More particularly the invention is concerned with the method of making leaders of silkworm gut opaque by soaking them in a solution of silver nitrate or salts of iron or platinum and then reducing the salts so deposited in the gut by light or chemical means leaving the metallic salts in fine grains on and below the surface and rendering the gut opaque to light.

Reference is now to be had to the accompanying drawing where there has been illustrated in the only practicable way, but very conventionally, an improved leader having its surface treated in accordance with the method of the invention. In the drawing—

Figure 1 shows a conventional type of leader of silkworm gut after having its surface coated with metal to render it opaque.

Figure 2 is a detail view in section and on a somewhat larger scale of a fragment of the leader shown in Figure 1.

It is proposed, in accordance with the invention, to render the leader opaque without destroying any of its desirable and necessary characteristics and to make the opaque quality of a permanent character so that manipulation of the leader will not destroy the coating which it is proposed to apply thereto. In the simplest form of the invention a leader of silkworm gut illustrated at *a* is soaked in a solution of a metallic salt which has the property of being reducible to the metallic state by light or chemical means. Various salts will suggest themselves to one skilled in the art, but it has been found that a one or two per cent solution of silver nitrate and salts of iron and platinum are satisfactory. In carrying out the method, when a silver salt is used, the gut is soaked in a water solution of silver nitrate and is then exposed to sunlight or other bright light. After about an hour's exposure, the gut will be found somewhat discolored, that is opaque to light to some extent. Sometimes, this discoloration will be found sufficient, but usually the gut will only have been given a light reddish or brownish tinge. Such treatment will not ordinarily be found sufficient and in this event, the gut is further treated in a bath containing weak photographic developer, for instance, metol hydrochinone, such as is used in the ordinary tank developing of photographic films. What is known to the trade as Eastman's special developer is also found satisfactory for this purpose. When the desired discoloration or opacity is effected, the leaders are removed from the bath, washed and dried. The method when iron or platinum salts are to be used is substantially the same. For instance, the gut may be soaked in a solution composed as follows: Ferric chlorid 50 grams, tartaric acid 15 grams, water 1 oz., and thereafter exposed to light and further treated in a bath containing a water solution of gallic acid. With platinum salts, the leaders may be soaked in the following solution: Potassium chloroplatinate 4 grams, ferric oxalate 4 grams, oxalic acid 25 grams, water 50 cubic centimeters. After exposing the leader soaked in this solution to light as described above they may be treated in a bath containing a saturated solution of potassium oxalate made acid with oxalic acid.

It has been found that better results have been obtained if this bath is warmed. After the leader has been soaked in the solution the salt $b$ is reduced to the metallic state by light or chemical means in a manner practised commonly in photography. The fine metallic particles deposited on and below the surface of the leader are opaque to light and entirely prevent those flashes which have been found objectionable in leaders heretofore employed. No effect as a lens is possible with the improved leader and it is rendered less visible and less alarming to fish than when merely stained.

The invention is not to be limited to the precise solution employed so long as the principle of the invention is practised.

What I claim is:

A silkworm gut leader composed of light transmitting material treated with metallic particles to make the leader opaque.

This specification signed this 27th day of January, A. D. 1922.

EDWARD R. HEWITT.